No. 776,184. PATENTED NOV. 29, 1904.
J. KALLSTROM.
COMBINED STIRRER AND TONGS.
APPLICATION FILED FEB. 26, 1904.
NO MODEL.
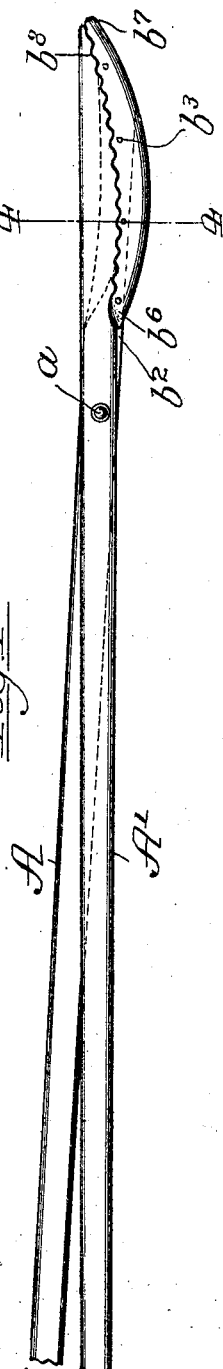
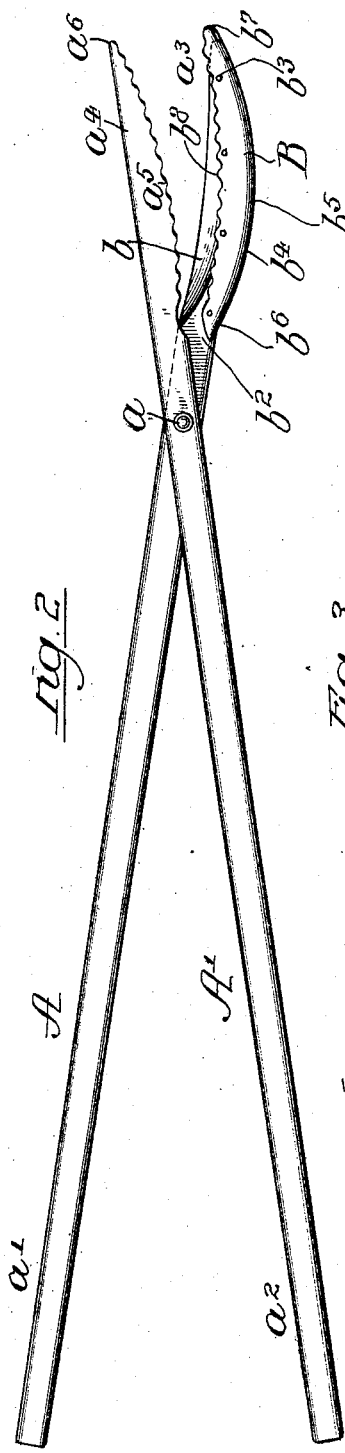
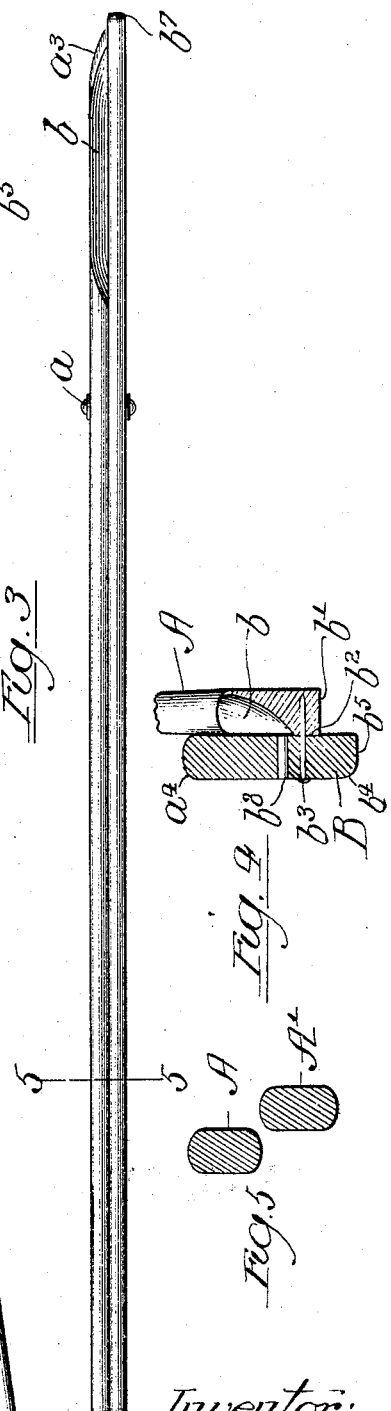
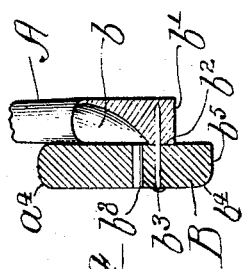
Witnesses:
Inventor:
John Kallstrom No. 776,184. Patented November 29, 1904.

UNITED STATES PATENT OFFICE.

JOHN KALLSTROM, OF CHICAGO, ILLINOIS.

COMBINED STIRRER AND TONGS.

SPECIFICATION forming part of Letters Patent No. 776,184, dated November 29, 1904.

Application filed February 26, 1904. Serial No. 195,429. (No model.)

*To all whom it may concern:*

Be it known that I, JOHN KALLSTROM, a citizen of the United States, and a resident of Chicago, in the county of Cook and State of Illinois, have invented certain new and useful Improvements in a Combined Stirrer and Tongs; and I do hereby declare that the following is a full, clear, and exact description thereof, reference being had to the accompanying drawings, and to the letters of reference marked thereon, which form a part of this specification.

This invention relates to combined stirrer and tongs for use in washing clothes in washtubs.

The object of the invention is to produce a cheap, durable, and satisfactory article of that class by which the clothes in the water in the washtub may be stirred and manipulated and at the same time whereby articles of clothing in the tub may be readily seized or grasped by means of the tongs and their position in the tub changed or may be bodily removed from the tub, thus obviating the necessity of the washwoman placing her hands in the boiling water.

The nature of the invention will be more readily understood by reference to the accompanying drawings, in which—

Figure 1 is a side view of a pair of tongs embodying my invention, the tongs being closed. Fig. 2 is a similar view, the tongs being opened. Fig. 3 is a top plan view of the tongs when closed. Fig. 4 is a transverse vertical sectional view taken upon the line 4 4 of Fig. 1, enlarged. Fig. 5 is a similar view, enlarged, taken through the line 5 5 of Fig. 3.

As shown in the drawings, A A' are the two members of the tongs suitably pivoted together at $a$, the longer portions of the members A A' constituting handles $a'$ $a^2$ and the shorter members, lettered $a^3$ $a^4$, constituting the gripping-jaws of the tongs. The upper and lower edges of the handle portions $a'$ $a^2$ are rounded, as shown more clearly in Fig. 5, so as to constitute a convenient and comfortable means of grasping the implement.

The under margin or edge of the jaw member $a^4$ is cut away on a curved line and suitably corrugated, as shown at $a^5$, and the point where the line of corrugations and the end of the jaw $a^4$ meet—to wit, $a^6$—is not a sharp but a rounded or blunt point.

The inner surface of the jaw member $a^3$ is provided with a longitudinally-disposed concave recess $b$, which recess in cross-section, Fig. 4, extends from the top margin to almost the bottom margin or edge $b'$, leaving a flat surface $b^2$, against which a third member B is secured to the jaw member $a^3$ by means of nails $b^3$ or other convenient means.

The third member B is rectangular in cross-section, having its lower outer edge $b^4$ rounded, as shown in Fig. 4, and being of crescent shape or curved throughout its length, as more clearly shown in Figs. 1 and 2. The lower curved surface $b^5$ extends for a portion of its length considerably below the straight-line surface $b'$ of the jaw member $a^3$, as more clearly seen in Figs. 1 and 4, the lower or inner end $b^6$ of the member B being positioned at a point below the recess $b$ and its forward end $b^7$ extending above and forward of the extreme end of the jaw $a^3$. The upper surface $b^8$ of the member B is concaved and corrugated to correspond with the corrugations in the jaw member $a^4$, whereby when the said tongs are closed the corrugations $b^8$ $a^5$ register, as clearly shown in Figs. 1 and 4. By making the corrugations not too deep and not too sharp and adapted to register one with the other and by placing the concave or recess $b$ behind the line of corrugations I find that I am enabled to take hold of clothes, and particularly delicate or thin garments, and remove them without the slightest danger of tearing them in the removal. The recess $b$ does away with all shearing effect which would otherwise be present if the two jaws $a^3$ and $a^4$ were to come together.

I have shown this invention as made in wood; but it is obvious that it may be made of metal and be equally effective. I have also shown the part B as a separate part; but it is perfectly obvious that it may be made integral with the member A. Nevertheless, the form in which I have shown the device is a cheap, simple, and durable construction and one which is exceedingly serviceable in operation.

What I claim, and desire to secure by Letters Patent, is—

In a combined stirrer and tongs, the pivotally-united members A A', the recess $b$ in the member A, the member B secured to the short end of said member A and so positioned as to form a gripping-jaw with the short end of the member A', the proximate surfaces of the jaws being corrugated, and meeting above the bottom of the recess $b$, substantially as described.

In testimony that I claim the foregoing as my invention I affix my signature, in presence of two witnesses, this 22d day of February, A. D. 1904.

JOHN KALLSTROM.

Witnesses:
TAYLOR E. BROWN,
GERTRUDE BRYCE.